United States Patent [19]
Smith

[11] Patent Number: 5,971,088
[45] Date of Patent: Oct. 26, 1999

[54] BATTERY CHARGING APPARATUS

[76] Inventor: Karl R. Smith, Ocean Colony Apt. 5-K 1620 S. Ocean Blvd., Pompano Beach, Fla. 33062

[21] Appl. No.: 08/821,604

[22] Filed: Mar. 20, 1997

[51] Int. Cl.⁶ .................................................... B60K 1/00
[52] U.S. Cl. ........................................... 180/165; 318/141
[58] Field of Search ................................ 180/65.1, 65.2, 180/65.3, 65.4, 165; 318/141, 154, 149, 153, 34, 41, 46, 53, 156, 57, 61, 63; 364/426.041; 290/9, 10, 11, 12, 17, 18, 19, 21

[56] References Cited

U.S. PATENT DOCUMENTS

| | | | |
|---|---|---|---|
| 4,578,955 | 4/1986 | Medina | 60/709 |
| 4,663,937 | 5/1987 | Cullin | 60/431 |
| 5,172,784 | 12/1992 | Varela, Jr. | 180/65 |
| 5,249,637 | 10/1993 | Heidl et al. | 180/65 |
| 5,323,737 | 6/1994 | Farrell | 123/18 |
| 5,402,046 | 3/1995 | Jeanneret | 318/139 |
| 5,415,245 | 5/1995 | Hammond | 180/165 |
| 5,432,383 | 7/1995 | Kawamura | 290/14 |
| 5,489,001 | 2/1996 | Yang | 180/65 |
| 5,513,719 | 5/1996 | Moroto et al. | 180/65 |
| 5,680,908 | 10/1997 | Reed | 180/165 |
| 5,823,280 | 10/1998 | Lateur et al. | 180/165 |

*Primary Examiner*—Richard M. Camby
*Attorney, Agent, or Firm*—Oltman, Flynn & Kubler

[57] ABSTRACT

A battery charging apparatus for a vehicle having a vehicle propulsion mechanism, vehicle accelerator mechanism, a vehicle drive train mechanism and a vehicle electrical system includes a vehicle battery, including an electric generator having a generator output shaft drivably connected to the vehicle drive train mechanism, a generator disengagement switch, a generator circuit electrically connecting the generator to the generator disengagement switch and to the vehicle battery, a mechanism for connecting the generator disengagement switch to the vehicle accelerator mechanism so that the disengagement switch opens the generator circuit during operation of the vehicle accelerator mechanism, and so that the disengagement switch closes the generator circuit during non-operation of the vehicle accelerator mechanism to prevent loss of vehicle kinetic energy to the generator during vehicle deceleration. Where the vehicle drive train mechanism includes a vehicle drive shaft, the apparatus includes an armature assembled onto and a field structure built around the vehicle drive shaft. The apparatus additionally includes a generator support structure fastened to the frame of the vehicle.

5 Claims, 3 Drawing Sheets

BATTERY CHARGING APPARATUS

BACKGROUND OF THE INVENTION

1. Field of the Invention

The present invention relates generally to the field of vehicle electrical system design. More specifically the present invention relates to a battery charging apparatus for vehicles for capturing some of the energy normally dissipated as heat in the wheel bearings or brakes during vehicle deceleration.

The apparatus includes an electric generator having an armature (stator) assembled onto, and a field structure (rotor) built around, the vehicle drive shaft. The generator is electrically connected to a transformer such as a conventional battery charger through a generator circuit which is in turn connected to the vehicle battery. The generator circuit includes a generator disengagement switch which is mechanically connected to the vehicle accelerator linkages to open the generator circuit when vehicle motor or engine power is being delivered to the vehicle wheels. This feature prevents expenditure of fuel energy to power the generator, so that only otherwise wasted energy is captured as the vehicle slows.

The generator floats vertically within a generator support structure fastened to the frame of the vehicle, includes a brace member extending from underneath the generator and having a resilient vertical biasing element for applying force upwardly against the generator to reduce the slight downward bowing of the drive shaft. The word "generator" is used in a broad sense throughout this specification and the claims to mean either a generator, an alternator or equivalent mechanism.

2. Description of the Prior Art

There have long been engine mounted generators for charging automobile and truck batteries. These most often have been mounted on brackets extending from an internal combustion engine and driven by a pulley drivably connected to the engine. A problem with this design is that it creates a drag on the engine as the engine is driving the vehicle wheels, and diminishes engine power and fuel mileage. Furthermore, such a generator would be of no value on an electrically powered vehicle, because net battery charge would be reduced if the generator were driven by the vehicle electric motor as the motor draws power from the batteries being charged.

Generators operated by vehicle drive shaft rotation are found in the art. Yet these generators operate whenever the vehicle is moving, so that while some wasted energy is captured during deceleration, useful energy is also lost during acceleration and speed maintenance. These prior generators also lack satisfactory and adequately explained generator support structures permitting the generator to rise, fall and vibrate with the vehicle suspension.

Farrell, U.S. Pat. No. 5,323,737, issued on Jun. 24, 1994, teaches an electric charging system for an electrically powered vehicle. An oscillating piston engine provides the motive power to drive an alternator connected through an input shaft to a variable transmission which is connected to a crankshaft. The electric power generated by the alternator charges two banks of batteries, each of which powers electric motors to drive each vehicle wheel.

Heidi, et al., U.S. Pat. No. 5,247,637, issued on Oct. 5, 1993, discloses a hybrid-propulsion vehicle having a front axle driven by an internal combustion engine and a rear axle driven by a first electric motor. The first electric motor is constructed around and delivers torque to the drive shaft just forward of the differential housing to drive the rear axle. This first motor always functions as a motor. A second motor is mounted on the engine itself in the conventional alternator location, and operates as a generator under certain conditions. No generator on the drive shaft is provided, and the hybrid drive construction does not seem suited to gathering wasted vehicle energy. Another hybrid propulsion vehicle is disclosed in Moroto, et al., U.S. Pat. No. 5,513,719, issued on May 7, 1996. A generator is drivably connected to an internal combustion engine output shaft, but is separate from the shaft and located within the engine compartment.

Medina, U.S. Pat. No. 4,579,955, issued on Apr. 1, 1986, reveals an automotive power plant. Medina includes an electric motor with a motor drive shaft extending to the transmission. The transmission has an output drive shaft connected to a vehicle differential for driving one or a pair of the vehicle wheels. A battery pack is connected to the electric motor by leads. A generator control switch is connected by a lead to the stator of a generator adapted to deliver power to the battery pack. The electric motor accelerates be vehicle to a certain speed, and then the power plant switches the drive to an internal combustion engine. The generator recharges the motor batteries while the internal combustion engine drives the vehicle. Vehicle kinetic energy is not selectively captured and transformed into electric energy. An electric motor is provided on the rear axle, but not the generator.

Kawamura, U.S. Pat. No. 5,432,383, issued on Jul. 11, 1995, teaches an electric generator system driven by a gas turbine to supply electricity for propelling an electric motor vehicle. Electric generators are mounted on the turbine rotatable drive shaft which is driven by combustion gas energy, so that the output power of the turbine is divided and borne by the electric generators. Depending on the rotational speed of the vehicle wheels, the electric generators are selectively operated and the generated electricity is supplied to the wheels.

Yang, U.S. Pat. No. 5,489,001, issued on Feb. 6, 1996, discloses a differential coupling and compound power system for a hybrid driven vehicle. A magnetic coupling and driving device are driven by the engine output shaft to act as an alternator for charging the battery of the vehicle. The magnetic coupling can also act as a motor to drive the vehicle while receiving power from the battery to drive the vehicle in unison with the engine. The magnetic coupling can also act as a vehicle brake. Yang states that its differential coupling and compound power system produce a hybrid electric vehicle in which the size of the engine can be minimized and can operate at a constant speed or a partially modulated speed to lower pollution effects, and that any associated reduction in power output is to be supplemented by the magnetic coupling and driving device. When the vehicle is braking, the magnetic coupling and driving device is capable of solely driving the vehicle, and also of providing initial torque to the engine to start the engine. Consistent and selective use of the magnetic coupling and drive device to gather wasted deceleration energy is not disclosed.

Additional art includes Cullin, U.S. Pat. No. 4,663,937, issued on May 12, 1987, for an electro-mechanical-hydraulic power generating system; and Jeanneret, U.S. Pat. No. 5,402,046, issued on Mar. 28, 1995, for a vehicle drive system in which a generator is connected to an engine by means of a gear train.

It is thus an object of the present invention to provide a battery charging apparatus which converts vehicle kinetic energy normally lost during braking and other vehicle deceleration into electric energy and for transmitting this electric energy to the vehicle battery.

It is another object of the present invention to provide such an apparatus which gathers energy from the vehicle drive train, and specifically from the drive shaft, and includes a generator within a generator support structure which permits the generator to float vertically with the vehicle suspension system.

It is still another object of the present invention to provide such an apparatus which is suitable for use on electric motor powered vehicles.

It is finally an object of the present invention to provide such an apparatus which is economical to manufacture and reliable.

SUMMARY OF THE INVENTION

The present invention accomplishes the above-stated objectives, as well as others, as may be determined by a fair reading and interpretation of the entire specification.

A battery charging apparatus is provided for a vehicle having a vehicle propulsion mechanism, vehicle accelerator mechanism, a vehicle drive train mechanism and a vehicle electrical system including a vehicle battery, including an electric generator having a generator output shaft drivably connected to the vehicle drive train mechanism, a generator disengagement switch, a generator circuit electrically connecting the generator to the generator disengagement switch and to the vehicle battery, a mechanism for connecting the generator disengagement switch to the vehicle accelerator mechanism so that the disengagement switch opens the generator circuit during operation of the vehicle accelerator mechanism, and so that the disengagement switch closes the generator circuit during non-operation of the vehicle accelerator mechanism to prevent loss of vehicle kinetic energy to the generator during vehicle deceleration.

The transformer preferably includes a conventional battery charger. The apparatus preferably additionally includes a transformer adapted to transform electric current and voltage produced by the electric generator to the operating current and voltage of the vehicle electrical system, the transformer being connected within the generator circuit.

Where the vehicle drive train mechanism includes a vehicle drive shaft, the apparatus includes an armature assembled onto and a field structure built around the vehicle drive shaft. The apparatus additionally includes a generator support structure fastened to the frame of the vehicle. The generator support structure preferably includes an inverted U-shaped guide channel fitted over and around the generator and the drive shaft, a lateral brace extending laterally beneath the vehicle and fastened to the vehicle and to the guide channel, opposing vertical slots in the guide member at forward and rearward guide member ends, a horizontal guide plate fastened across the forward end and the rearward end of the generator field structure, the ends of each guide plate extending through the corresponding opposing vertical slots, so that the generator is retained by the guide channel and the guide plate against longitudinal movement and is free to rise and fall with the drive shaft, an axle bolt extending horizontally through each exposed end of each guide plate, and a wheel assembly mounted onto each axle bolt, so that the wheel assemblies each ride against the sides of the guide channel which restrains the generator against lateral movement relative to the guide channel and which smoothly guides the generator up and down within the guide channel.

The wheel assembly preferably includes a ball bearing. The apparatus preferably additionally includes a waterproof shell for shielding the generator from splashed road water and high humidity, a brace member extending from underneath the generator and having a resilient vertical biasing element for applying force upwardly against the generator to reduce downward bowing of the drive shaft.

A battery charging apparatus is also provided for a vehicle having a vehicle propulsion mechanism, a vehicle accelerator mechanism, a vehicle drive train mechanism and a vehicle electrical system including a vehicle battery, including an electric generator having a generator output shaft drivably connected to the vehicle drive train mechanism, a generator circuit electrically connecting the generator to the vehicle battery, a generator support structure fastened to the frame of the vehicle, where the generator support structure includes an inverted U-shaped guide channel fitted over and around the generator and the drive shaft, a lateral brace extending laterally beneath the vehicle and fastened to the vehicle and to the guide channel, opposing vertical slots in the guide member at forward and rearward guide member ends, a horizontal guide plate fastened across the forward end and the rearward end of the generator field structure, the ends of each guide plate extending through the corresponding opposing vertical slots, so that the generator is retained by the guide channel and the guide plate against longitudinal movement and is free to rise and fall with the drive shaft, an axle bolt extending horizontally through each exposed end of each guide plate, and a wheel assembly mounted onto each axle bolt, so that the wheel assemblies each ride against the sides of the guide channel which restrains the generator against lateral movement relative to the guide channel and which smoothly guides the generator up and down within the guide channel.

BRIEF DESCRIPTION OF THE DRAWINGS

Various other objects, advantages, and features of the invention will become apparent to those skilled in the art from the following discussion taken in conjunction with the following drawings, in which:

FIG. 5 is an upwardly directed perspective view of the support panel, support tubes and panel bolts, also showning the spring cup and spring (in broken lines where hidden by the panel).

DETAILED DESCRIPTION OF THE PREFERRED EMBODIMENTS

Figure 1:
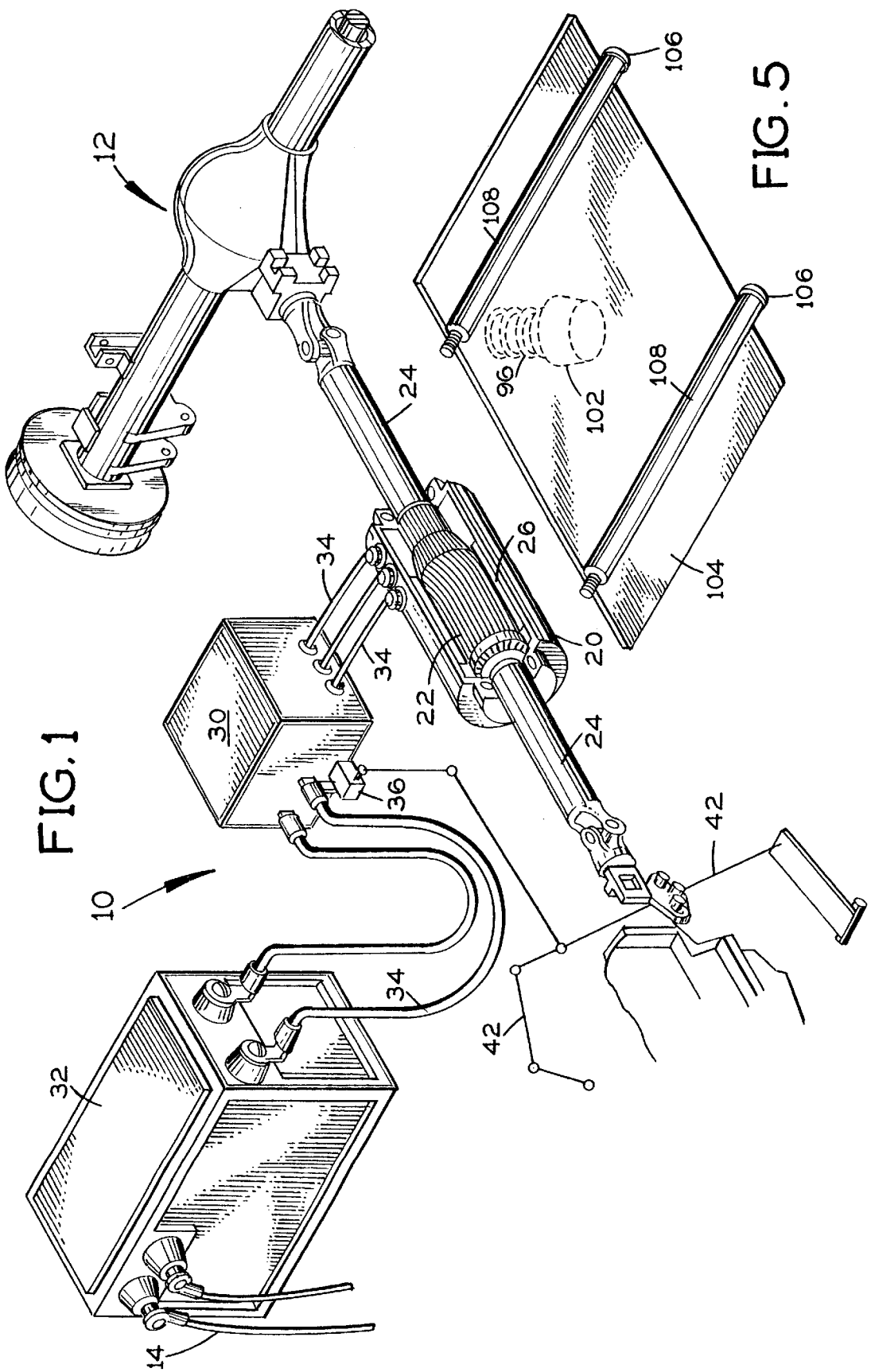
FIG. 1 is a broken away perspective view of the drive shaft, rear axle and acceleration linkages of a vehicle, and of the inventive apparatus having the generator built into and around the vehicle drive shaft, excluding the generator support structure.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
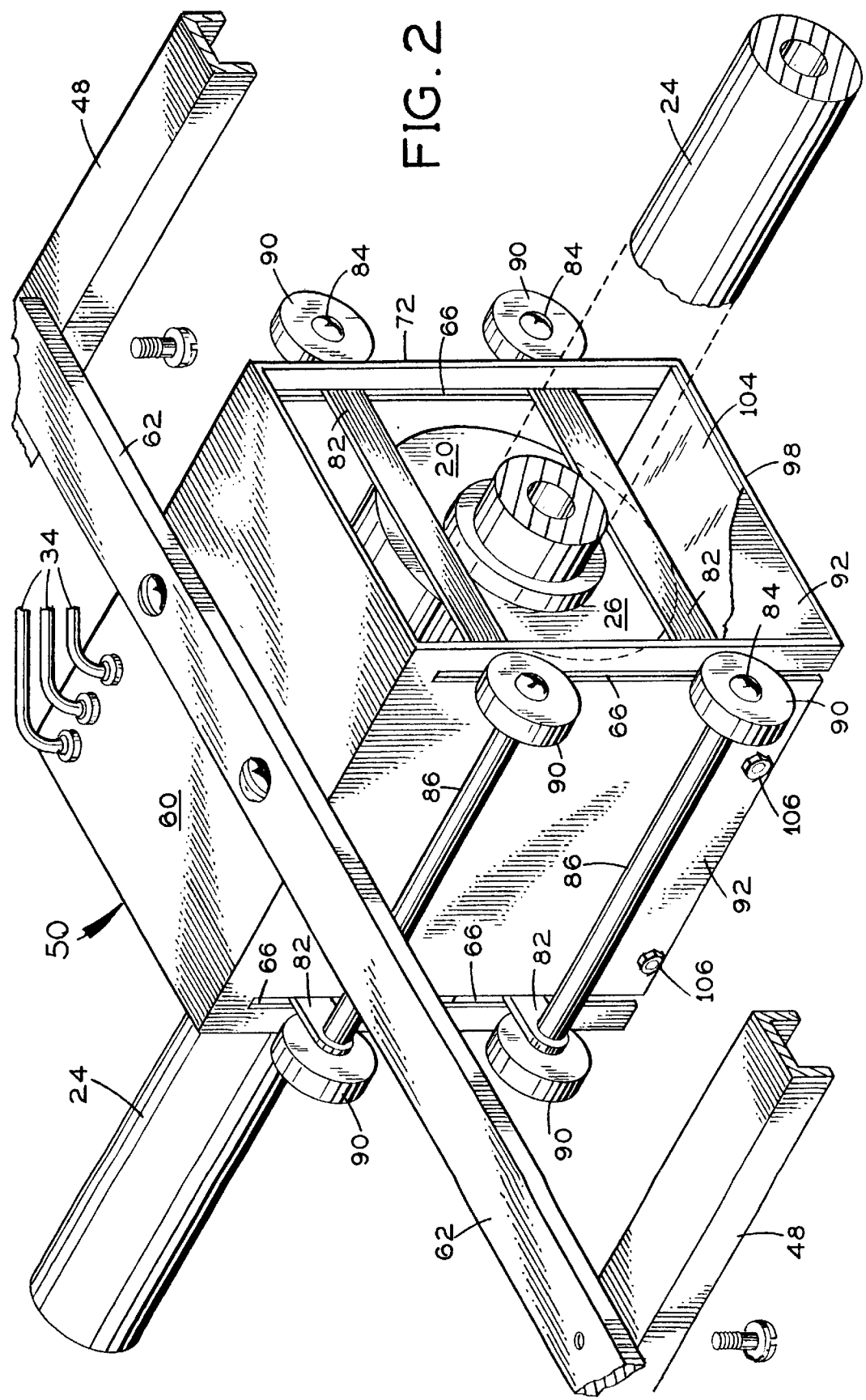
FIG. 2 is a perspective view of the generator support structure and generator mounted inside the support structure. The waterproof support structure shell is shown broken away on the front face to reveal the inner construction. The vehicle drive shaft and vehicle frame segments to which the apparatus is fastened are shown in broken lines. Exemplary fastening bolts are illustrated.
Figure 3:
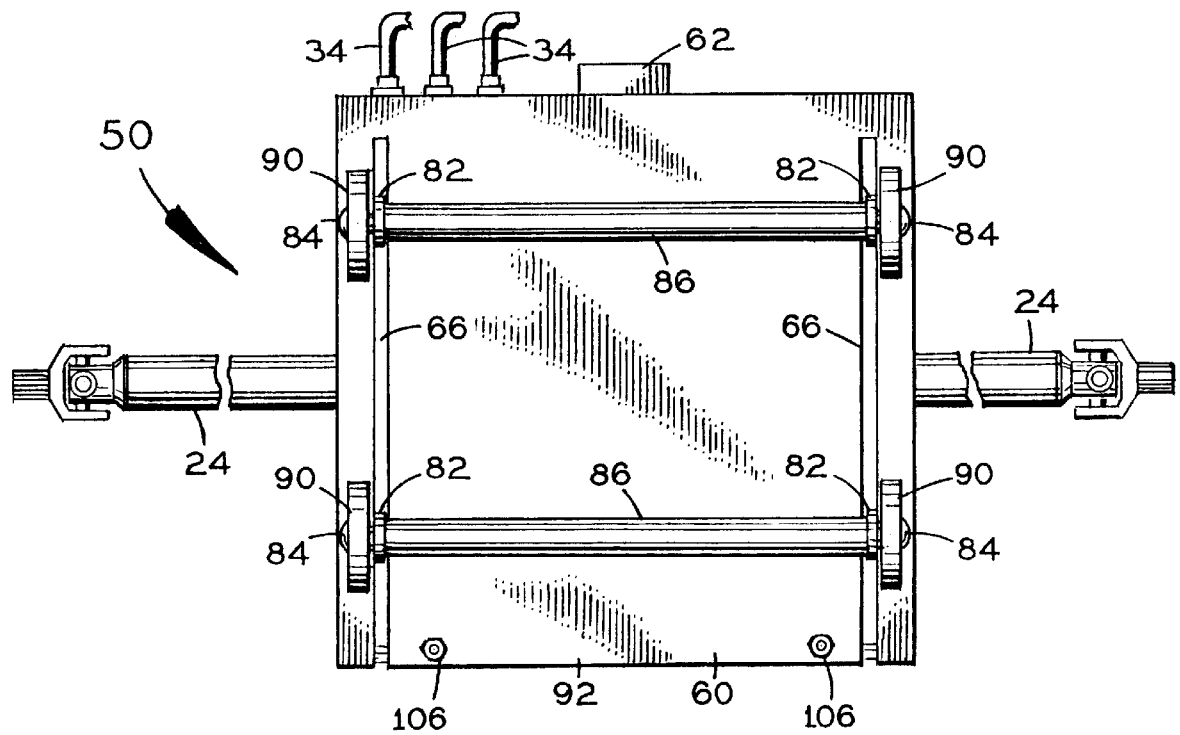
FIG. 3 is a side view of the support structure with the wheel assemblies shown in cross-section to reveal the metal ball elements of the preferred ball bearing cores. The vehicle drive shaft extends through the support structure. The preferred channel-iron cross brace connecting the support structure to the vehicle frame is shown in end view.
Figure 4:
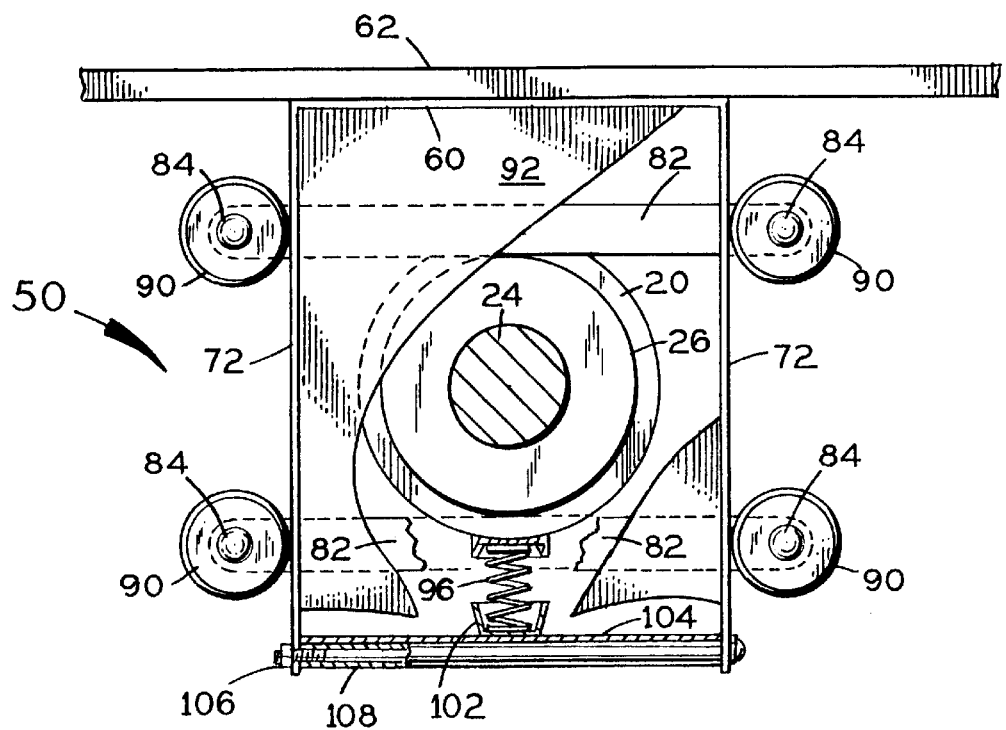
FIG. 4 is an end view of the support structure of FIG. 3. The cross brace is also shown, with the brace ends broken away. The generator supporting coil spring and coil spring support brace of the generator support structure are visible in this view.

Referring to FIGS. 1–5, a battery charging apparatus 10 is disclosed for incorporation into the drive train 12 of a vehicle having a vehicle electrical system 14. Apparatus 10 includes an electric generator 20 having a generator armature 22 assembled onto or manufactured as part of the vehicle drive shaft 24. See FIG. 1. A generator field structure 26 is built around the armature 22 and vehicle drive shaft 24. Generator bearings, preferably ball bearings, at the generator 20 ends and the field structure 26 and generator outer casing are diametrically split for installation around drive shaft 24. Generator 20 is electrically connected to a transformer such as a conventional battery charger 30 through a generator circuit 34 which is in turn connected to the vehicle battery 32, and captures some of the energy normally dissipated as heat in the vehicle wheel bearings and brakes during vehicle deceleration.

A generator 20 disengagement switch 36 is provided within generator circuit 34 and mechanically connected to the vehicle accelerator linkages 42 to open the generator circuit 34 during vehicle acceleration. This feature prevents loss of vehicle fuel energy to generator 20 operation, so that only kinetic energy which is otherwise wasted is captured converted as the vehicle slows.

Generator 20 is constrained to float vertically within a generator support structure 50 fastened to the vehicle frame 48. See FIGS. 2–4. Support structure 50 includes an inverted U-shaped guide channel 60 fitted over and around the generator 20 and drive shaft 24. A guide member mounting brace such as a channel brace 62 extends laterally beneath the vehicle and is fastened to the longitudinal segments of the vehicle frame 48 and to the top surface of the guide channel 60. opposing vertical slots 66 are provided in the vertical flanges 72 of guide channel 60 at forward and rearward guide channel 60 ends. Horizontal brace plates 82 are welded laterally across the forward end and the rearward end of the generator field structure 26 and the ends of each guide plate 82 extend through corresponding opposing vertical slots 66, so that the generator 20 is retained by guide channel 60 and guide plates 82 against longitudinal movement and yet is free to rise and fall with the drive shaft 24 and vehicle suspension system. An axle bolt 84 extends horizontally through the exposed ends of the guide plates 82 on each side of guide channel 60 and a ball bearing wheel assembly 90 is mounted onto each axle bolt 84 and against a guide plate 82 end. A spacer tube 86 surrounds each axle bolt 84 and holds opposing guide plates 82 a fixed distance apart. Wheel assemblies 90 each ride against the outer faces of guide channel vertical flanges 72 restrain the generator 20 against lateral movement and smoothly guide generator 20 up and down within guide channel 60 with minimal friction.

Support structure 50 includes a waterproof shell 92 for shielding the generator 20 from splashed road water and high humidity. Shell 92 includes guide channel 60 and a sealingly interlocking U-shaped cap 98. Cap 98 is secured to channel 60 with fasteners (not shown), fits sealingly around the drive shaft and encloses the front, rear and bottom areas of guide channel 60. The support structure 50 further includes a support panel 104 extending underneath generator 20 and a resilient vertical biasing element such as a coil spring 96 for applying force upwardly against generator 20 to compensate for the generator 20 weight on drive shaft 24 and the resulting slight downward bowing of the drive shaft 24. See FIG. 4. Spring 96 is mounted within a spring cup 102 which is mounted on spring support panel 104. Spring support panel 104 is fitted up and into the lower end of guide channel 60 so that the upper end of spring 96 bears against generator 20. Spring support panel 104 is then secured in place by panel support bolts 106 which pass laterally through holes in the lower ends of vertical flanges 72 and through retaining tubes 108 welded to the lower face of support panel 104. See FIG. 5. Support panel 104 can be removed from support structure 50 by removing support bolts 106, so that generator 20 and drive shaft 24 can be dropped down for servicing. Support panel 104 is also removed for apparatus installation.

Apparatus 10 is primarily intended for use on electrically powered vehicles, such as the new and proposed electric automobiles. Delivery of gathered and transformed energy into the vehicle battery block sustains the battery charge longer and increases mileage between vehicle recharging. Use of apparatus 10 on vehicles powered by existing gasoline engines and other types of engines is contemplated. The term "generator" is used in its broadest sense, and is understood to include alternators. It is contemplated that the generator 20 could be separate from the drive shaft but drivably connected to the drive shaft by a mechanical power transmission structure such as a gear train. Generator circuit 34 may also include a capacitor (not shown) for retaining and then discharging energy from generator 20 to battery 32.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A battery charging apparatus for a vehicle having a vehicle propulsion means, vehicle accelerator means, vehicle drive train means and a vehicle electrical system including a vehicle battery, comprising:

an electric generator having a generator output shaft drivably connected to said vehicle drive train means, a generator disengagement switch, a generator circuit electrically connecting said generator to said generator disengagement switch and to said vehicle battery, and means for connecting said generator disengagement switch to the vehicle accelerator means such that said disengagement switch opens said generator circuit during operation of said vehicle accelerator means, and such that said disengagement switch closes said generator circuit during non-operation of said vehicle accelerator means to prevent loss of vehicle kinetic energy to said generator during vehicle deceleration, said vehicle drive train means comprising a vehicle drive shaft, said apparatus comprising an armature assembled onto and a field structure built around said vehicle drive shaft, a generator support structure fastened to the frame of the vehicle, said generator support structure comprising:

an inverted U-shaped guide channel fitted over and around said generator and said drive shaft, a lateral brace extending laterally beneath the vehicle and fastened to said vehicle and to said guide channel, opposing vertical slots in said guide member at forward and rearward guide member ends, a horizontal guide plate fastened across the forward end and the rearward end of said generator field structure, the ends of each said guide plate extending through the corresponding opposing vertical slots, such that said generator is retained by said guide channel and said guide plate against longitudinal movement and is free to rise and fall with said drive shaft, an axle bolt extending horizontally through each exposed end of each said guide plate, and a wheel assembly mounted onto each said axle bolt, such that said wheel assemblies each ride against the sides of said guide channel which restrains said generator against lateral movement relative to said guide channel and which smoothly guides said generator up and down within said guide channel.

2. An apparatus according to claim 1, additionally comprising a transformer adapted to transform electric current and voltage produced by said electric generator to the operating current and voltage of said vehicle electrical system, said transformer being connected within said generator circuit.

3. An apparatus according to claim 1, wherein said wheel assembly comprises a ball bearing.

4. An apparatus according to claim 1, additionally comprising:

a waterproof shell for shielding said generator from splashed road water and high humidity, a brace member extending from underneath said generator and having a resilient vertical biasing element for applying force upwardly against said generator to reduce downward bowing of said drive shaft.

5. A battery charging apparatus for a vehicle having a vehicle propulsion means, vehicle accelerator means, vehicle drive train means and a vehicle electrical system including a vehicle battery, comprising:

an electric generator having a generator output shaft drivably connected to said vehicle drive train means, a generator circuit electrically connecting said generator to said vehicle battery, a generator support structure fastened to the frame of the vehicle, wherein said generator support structure comprises:

an inverted U-shaped guide channel fitted over and around said generator and said drive shaft, a lateral brace extending laterally beneath the vehicle and fastened to said vehicle and to said guide channel, opposing vertical slots in said guide member at forward and rearward guide member ends, a horizontal guide plate fastened across the forward end and the rearward end of said generator field structure, the ends of each said guide plate extending through the corresponding opposing vertical slots, such that said generator is retained by said guide channel and said guide plate against longitudinal movement and is free to rise and fall with said drive shaft, an axle bolt extending horizontally through each exposed end of each said guide plate, and a wheel assembly mounted onto each said axle bolt, such that said wheel assemblies each ride against the sides of said guide channel which restrains said generator against lateral movement relative to said guide channel and which smoothly guides said generator up and down within said guide channel.

* * * * *